May 13, 1969     F. HANSELMANN     3,443,759
WINDSHIELD WASHING DEVICE
Filed Sept. 1, 1967     Sheet 1 of 2
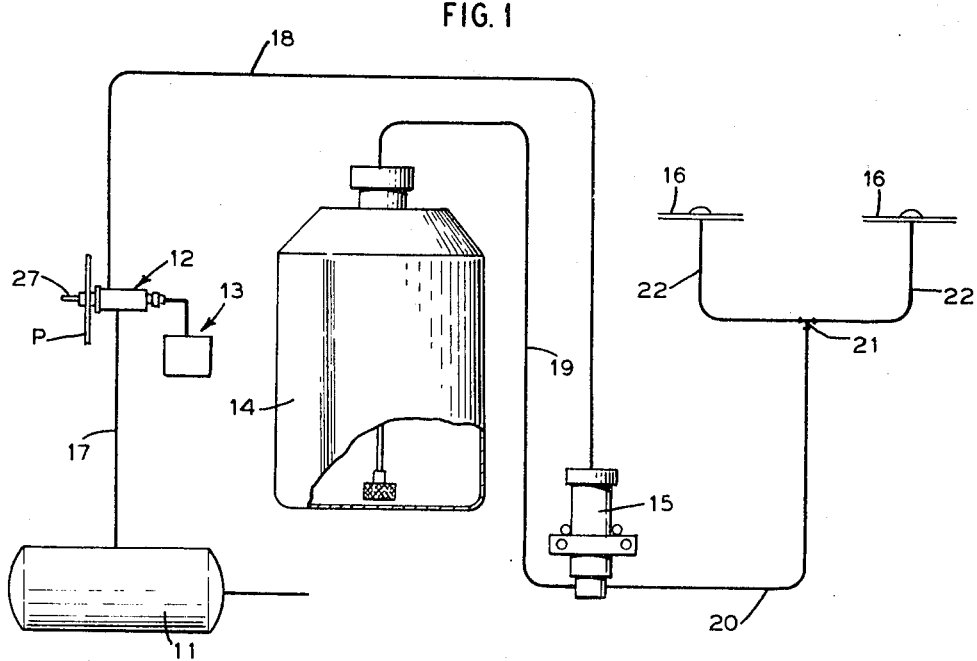
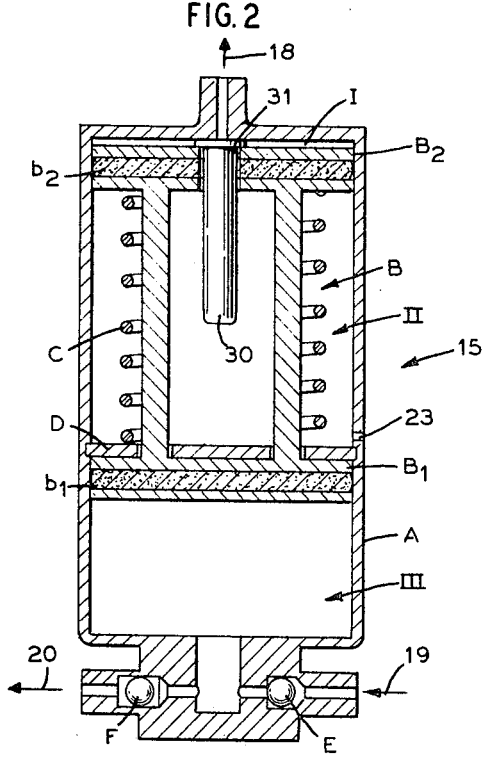
INVENTOR.
Frank Hanselmann
BY
ATTORNEY

United States Patent Office 3,443,759
Patented May 13, 1969

3,443,759
WINDSHIELD WASHING DEVICE
Frank Hanselmann, Seestrasse, Stafa, Switzerland
Filed Sept. 1, 1967, Ser. No. 665,125
Claims priority, application Germany, Dec. 5, 1966,
H 60,420
Int. Cl. B60s 1/46
U.S. Cl. 239—284  9 Claims

ABSTRACT OF THE DISCLOSURE

A windshield washing device including a pneumatically activated pump means for delivering washing fluid; the pump means being operated from a source of gas of limited volume and under pressure, by means of a control valve.

Background of the invention

While various devices for washing windshields with fluid have been proposed; such known devices exhibit a number of disadvantages including: operation at low pressures which causes the fluid jet emerging from the device to be deflected from the windshield in the advent of strong headwinds and high vehicle speeds; the use of gravity operated pumps which requires the washing fluid container to be located at a level above that of the pump, thus causing inconveniences in mounting the device.

Accordingly, an object of this invention is to provide a fluid jet windshield washing device which is operative at high pressures so as to positively direct the fluid jet despite adverse environmental conditions.

Another object of this invention is to provide in a device of the character described, improved pump means particularly adapted for use with air compressors as a source of gas under pressure, as may be normally found in trucks, buses, trains and the like.

A further object of the invention is to provide in a device of the character described, improved control valve means operative to connect selectively a pressure gas surge tank with the source of compressed gas or the pump; thereby passing only a predetermined quantity of gas under pressure to the pump to avoid gas losses and to insure a maintained pressure for the jet spray of washing liquid.

Still another object of this invention is to provide in a device of the character described, improved pump means which includes pilot valve means for determining the optimum cyclical operation of the pump means.

Yet another object of this invention is to provide in the device of the character described, circuit means for operating an electrically actuated windshield wiper means, in response to operation of the pump means of the device; thereby achieving simultaneous operation of the windshield spray and wiper means.

Summary of the invention

The instant invention relates to a pneumatically operated windshield spray means wherein there is provided improved pump means for receiving a measured amount of gas under pressure from a source of gas under pressure via a gas pressure surge tank, to pass washing fluid under a constant high pressure to washing nozzles for jet application to a windshield; the system being controlled by a pneumatically responsive valve means.

Brief description of the drawings

FIG. 1 is a diagrammatic showing of a windshield washing system embodying the invention;

FIG. 2 is a vertical sectional view of the pump means forming part of the system;

Description of the preferred embodiment

Figure 3:
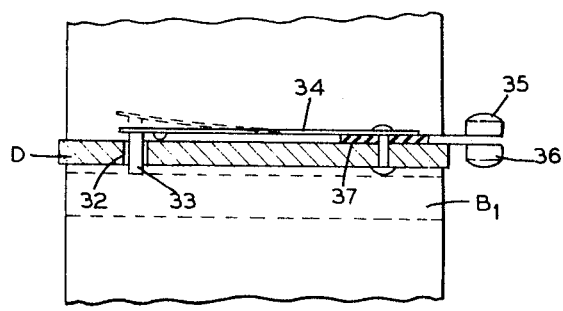
FIG. 3 is a transverse sectional view showing the switch control means for operating a windshield wiper, in association with the pump means.

As shown in FIG. 1, the windshield washing apparatus embodying the instant invention, comprises a source of air or other gas under pressure, as a compressed air tank 11; a pressure responsive control valve 12 connected to tank 11 by way of a line 17 and also connected to a pressure-gas surge tank 13 and to pump means 15 by way of a line 18.

A container for holding washing fluid, indicated at 14 is also connected to pump 15 by way of a line 19; and pump 15 is further connected to the windshield washer nozzles 16 by way of a line 20, a T connector 21 and branch lines 22.

The source of air under pressure may be the tank of a conventional air compressor usually found in trucks, buses, trains, etc., or may be the air under pressure in a spare tire.

In normal operation of the apparatus, at standstill, the pump 15 carries a quantity of washing fluid taken from container 14 by way of line 19. Upon operation of control valve 12 to actuate pump 15, the washing fluid passes from the pump 15 to the nozzles 16 by way of line 20, T 21 and branch lines 22. At the end of the operation of valve 12, pump 15 is effective to draw washing fluid from container 14 into the pump, ready for the next operation of valve 12.

As shown in FIG. 2, the pump 15 comprises a casing A in which a piston assembly B is arranged for reciprocation. Piston assembly B comprises a pair of spaced piston members $B_1$, $B_2$ rigidly interconnected by a strut support and carrying sealing gaskets $b_1$, $b_2$. The piston members $B_1$, $B_2$ divide the interior of casing A into a pressure gas chamber I at the upper end thereof, an intermediate chamber II which vents to the atmosphere through a vent opening 23 in casing A, and a washing fluid chamber III at the lower end thereof.

The fluid chamber III is connected to lines 19, 20 by way of ball valves E, F respectively and gas chamber I is connected at its upper end to line 18. It will be apparent that ball valves E, F are effective to cause washing liquid to be sucked into chamber III from line 19 or to be discharged to nozzles 16 by way of line 20, in accordance with the position of piston assembly B.

Further, an abutment plate D is fixed within casing A with openings therein to pass the connecting portions of piston members $B_1$, $B_2$ and providing abutment means for coil spring C at the lower end thereof, the upper end of the spring abutting upper piston member $B_2$ to thereby normally raise piston assembly B to the position indicated in FIG. 2.

Figure 4:
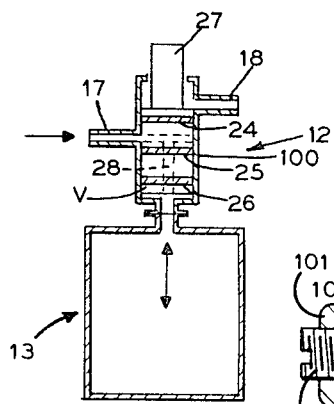
FIG. 4 is a vertical sectional view showing the control valve of the system.

As shown in FIG. 4, the control valve 12 comprises a small casing in which is slidably mounted a valve member having spaced sealing gaskets 24, 25 and 26, which member is actuated by a push button 27 projecting through mounting panel P, see FIG. 1. The valve member includes a T shaped passage means 28 which provides for communication between surge tank 13 and line 18, in the raised position thereof, and between tank 13 and line 17, in the depressed position thereof, as shown in FIG. 4, and thereby cutting off line 18.

When push button 27 is released after depression, the valve member is restored to its raised, standstill position, by the pressure prevailing in tank 13; thereby permitting the quantity of gas within tank 13 to pass to pump 15 by way of line 18. It is understood that tank 13 may be disconnected from valve 12 for replacement by another tank of larger or smaller capacity, thereby allowing the system to be adjusted to a particular charge of compressed air.

When the valve 12 is actuated, the contents of tank 13 pass to chamber I of pump 15 by way of line 18, causing the piston assembly B to move downwardly until piston member $B_1$ abuts the bottom of casing A. In the meantime, a plunger 30 of a pilot valve 31 mounted in a central opening of piston member $B_2$, engages the abutment plate D to unseat valve 31, thereby providing communication between chambers I and II at the end of the downward stroke, to pass residual gas outwardly of casing A by way of vent 23. The spring C is then effective to restore the piston assembly B to its standstill, raised position, while simultaneously fluid from container 14 is sucked into fluid chamber III by way of line 19 and the action of the ball valves E and F.

Under the action of spring C, the valve 31 is clamped between piston member $B_2$ and the adjacent top wall of casing A, to keep said valve in its closing position. Thus, the pilot valve 31 operates in a purely mechanical manner at opposite ends of the stroke of piston assembly B.

While the piston members $B_1$ and $B_2$ are shown as having the same diameter; it is understood that they may have differing diameters, with predetermined ratios of such diameters. This would allow the use of the device with a low pressure source, by amplifying such low pressure to a higher operating value. Obviously, the casing A would be modified to accommodate the piston members of differing diameters.

To assure that tank 13 is filled with air of adequate pressure when push button 27 of control valve 12 is depressed for only a short time interval, suitable detent means may be used to retain the valve member V of valve 12 in the position indicated in FIG. 4, until a desired pressure is achieved. Such detent means is shown in detail, in FIG. 5.

Figure 5:
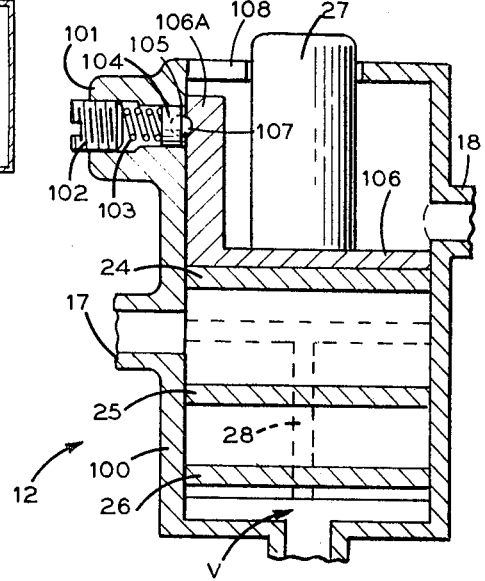
FIG. 5 is a view similar to that of FIG. 4, showing a modification thereof.

As indicated in FIG. 5, the casing 100 of valve 12 includes a tubular portion 101 projecting from one side thereof and at the upper end thereof and communicating with the interior of said casing. Casing portion 101 is internally threaded to receive a set screw 102 which controls the bias of a helical spring 103 located within casing portion 101. The outer end of spring 103 is connected to an abutment member 104 slidable within casing portion 101 and carrying a ball detent 105.

The valve member V of control valve 12 has affixed to the upper portion thereof, an L-shaped member 106 having an upstanding arm 106A slidably related to the vertical adjacent wall of casing 100 and formed on its inner surface with a recess 107 for receiving therein the ball detent 105. It will be apparent that ball detent 105 is effective to hold the valve member V in the position indicated in FIG. 5, until the pressure against valve member V is sufficient to overcome the bias of spring 103, thereby allowing the valve member V to move upward. The top wall of the casing 100 is formed with an opening 108 to pass the arm 106A as it moves upwardly.

When the pressure in tank 13 is insufficient to restore valve member V to its raised standstill position, the connection to line 18 is cut off and supply tank 11 must be renewed with a further supply of gas under pressure. It will be apparent that the action of detent 105 may be adjusted by proper setting of screw 192 to adjust the bias value of spring 103, thereby allowing the detent 105 to respond to predetermined pressure values.

The washing device of the instant invention may be used to control the operation of electrically actuated windshield wiper means. Thus, as shown in FIG. 3, the abutment plate D is formed with an opening 32 for receiving a movable pin 33 which projects from the outer end of a switch contact spring 34 connected to a switch terminal 35. A second switch terminal 36 is electrically connected to plate D which is insulated from spring 34 by insulation 37.

The spring 34 normally tends to keep its contact separated from plate D and therefore opens the circuit including terminals 35, 36 and the wiper mechanism, not shown. When piston assembly B is depressed, through actuation of valve 12, piston member $B_1$ moves downwardly and away from pin 33 to allow the spring 34 to move toward plate D and to make electrical contact therewith and to close the circuit for operating the wiper mechanism, not shown, in conjunction with the operation of the washing device. At the end of the return stroke of piston assembly B, piston member $B_1$ will in its raised position be effective to engage pin 33 and thereby raise spring 34 away from plate D, to open the circuit including terminals 35, 36. It will be apparent that the wiper mechanism will be operative after the spray from nozzles 16 has ceased, as the piston assembly B moves upwardly, to thereby remove residual wash liquid by the wiper mechanism.

It will be understood that the instant device operates automatically, simply upon depressing push button 27, to spray washing fluid from nozzles 16 at high jet pressures and therefore with directional stability. The fluid supply container 14 is not under pressure which permits easy filling of the same and its construction may be simple since it does not have to be pressure resistant. Further, the quantity of washing fluid is preset for each washing operation. Also, no fluid carrying lines extend to valve 12, and do not pass beyond panel P.

When the piston members of piston assembly B are of different diameters, it is understood that the casing containing the same will have corresponding sectional portions to receive the piston members.

As various changes might be made in the herein disclosed embodiment of the invention without departing from the spirit thereof, it is understood that all matter herein shown or described shall be deemed illustrative and not by way of limitation except as set forth in the appended claims.

I claim:
1. Windshield washing apparatus comprising first container means for carrying wash liquid, pneumatically operated pump means, nozzle means, conduit means connecting said pump means with said first container means, conduit means connecting said pump means with said nozzle means, second container means for gas under pressure, third container means for holding a predetermined quantity of gas under pressure, control valve means interconnecting said second and third container means with said pump means, said control valve means being operative to connect said second container means to said third container means for passing a predetermined quantity of gas under pressure from said second container means to said third container means, and thence operative to connect said third container means with said pump means to pass said predetermined quantity of gas under pressure to said pump means to actuate said pump means to pass a measured quantity of wash liquid from said first container means to said nozzle means.

2. Apparatus as in claim 1 wherein said pump means comprises a casing, a piston assembly slidably mounted in said casing and including a pair of spaced piston members in fixed relation to each other and dividing said casing into a gas receiving chamber, a wash liquid receiving chamber and a chamber intermediate said gas and liquid receiving chambers, said intermediate chamber being vented to atmosphere, and conduit means connecting said liquid receiving chamber with said first container means and said nozzle means respectively.

3. Apparatus as in claim 2, and further including a pair of valve means respectively controlling the conduit means connecting said liquid receiving chamber with said first container means and said nozzle means.

4. Apparatus as in claim 2 and further including pilot valve means connecting said gas receiving and intermediate chambers, said pilot valve means being actuated to an open position in response to movement of said piston assembly in said casing.

5. Apparatus as in claim 2 and further including abutment means fixed within said casing, and spring means between said abutment means and one end of said piston assembly for biasing said piston assembly to one position thereof.

6. Apparatus as in claim 5 and further including circuit means for operating electrically actuated mechanism in response to movement of said piston assembly, said circuit means including said abutment means and spring contact means in insulated relation to said abutment means, said spring contact means including a contact for engaging said abutment means, and means on said piston assembly for displacing said spring contact means upon movement of said piston assembly to one position thereof and for allowing said spring contact means to move to engage the contact thereof with said abutment means upon movement of said piston assembly away from said one position thereof.

7. Apparatus as in claim 1 wherein said control valve means comprises a slidable valve member, manually operable means for moving said slidable valve member, said valve member having passage means for selectively connecting said third container means with said first container means and said pump means in accordance with the position thereof, said valve member being restored automatically to its rest position after operation of said manually operable means, by the pressure of said third container means.

8. Apparatus as in claim 2 wherein said pair of piston members are of respectively different surface area and said casing has corresponding sections for slidably receiving said respective piston members, whereby the pressure in said liquid receiving chamber is greater than that in said gas receiving chamber.

9. Apparatus as in claim 7 and further including adjustable detent means for retaining said slidable valve member and releasable in response to predetermined pressures.

References Cited

UNITED STATES PATENTS

| | | | |
|---|---|---|---|
| 1,942,402 | 1/1934 | Anthony et al. | 91—401 X |
| 2,153,519 | 4/1939 | Horton | 15—250 |
| 2,688,514 | 9/1954 | Oishei et al. | |
| 3,059,263 | 10/1962 | Webb | 15—250.02 |

ALLEN N. KNOWLES, *Primary Examiner.*

BERNARD BELKIN, *Assistant Examiner.*

U.S. Cl. X.R.

15—250.02; 91—401; 103—50